United States Patent Office

2,696,444
Patented Dec. 7, 1954

2,696,444

MODIFIED SILICA AQUASOL AND TEXTILE FIBERS TREATED THEREWITH

Elmer H. Rossin, Melrose, Mass., assignor to Monsanto Chemical Company, St. Louis, Mo., a corporation of Delaware No Drawing. Application August 30, 1949,
Serial No. 113,252

9 Claims. (Cl. 106—287)

The present invention relates to textile fiber processing compositions, and it more particularly relates to compositions for application to cellulosic textile fibers prior to spinning.

It is one object of this invention to provide improved textile fibers and processing compositions which when applied to textile fibers at some stage of their processing prior to spinning will improve the inter-fiber friction of such fibers without the loss or dusting off of the active ingredients of the composition during the subsequent manipulations of the fibers.

A further object of this invention is to provide improved textile fiber processing compositions which when applied to cellulosic textile fibers subsequent to carding will improve the inter-fiber friction of such fibers and at the same time are capable of remaining on the fibers substantially without dusting off.

Still further objects and advantages of this invention will be apparent from the following description and appended claims.

The compositions of this invention consist of stable, homogenous aqueous solutions comprising as essential ingredients a stable alkaline reacting silica aquasol and a water-soluble condensation product of an alkylene oxide such as ethylene oxide with an ester of a fatty acid containing from 10 to 20 carbon atoms such as oleic acid and a polyhydric alcohol containing from 3 to 6 carbon atoms and from 3 to 6 hydroxyl groups, for example, sorbitan. The compositions may also contain small amounts, for example, from 0.1 to 1% of an anionic wetting agent as, for example, an alkyl aryl sulfonate such as decyl or dodecyl benzene sodium sulfonate, or dioctyl sodium sulfosuccinate. The compositions may also comprise small amounts of other materials such as dyes, tints etc.

The term "stable" as used herein is intended to designate compositions in which the silica, which is in a colloidal state, does not set up as a gel, or precipitate from the compositions on standing, for periods as long as 10 to 18 months.

The alkaline reacting silica aquasols referred to herein have a pH (as measured by the glass electrode) between 8 and 11 and consist essentially of water and colloidal silica. The silica is present therein in amounts within the range between 5 and 45% by weight. It is preferred, however, to employ alkaline reacting silica aquasols having a pH between 9.0 and 10.5, and which contain between 5 and 35% by weight of colloidal silica. Such silica aquasols are stable for periods of 12 months and longer and are infinitely dilutable with water without precipitation of silica. The silica is present in these aquasols and in the compositions described herein in the form of discrete, ultramicroscopic particles or agglomerates having average particle diameters between about 40 millimicrons and 1 micron.

Alkaline reacting silica aquasols having the characteristics described above may be prepared in a variety of ways. One suitable method of preparing such sols consists in treating a dilute solution of an alkali metal silicate containing 5% or less of $SiO_2$ with a cation-exchange material, as described in the patent to Paul C. Bird, No. 2,244,325, adjusting the resulting sol to the proper pH, as hereinbefore defined, and then concentrating the sol by evaporating off water.

A preferred method for preparing such aquasols consists in first reacting a mineral acid such as sulfuric acid with a water-soluble silicate such as sodium silicate until an acid reacting sol is obtained. The resulting sol soon sets up into a gel which is then broken up into lumps and washed with water to remove the electrolytes formed during the reaction between the acid and the silicate. The washed gel is covered with a weak aqueous solution of a substance capable of forming hydroxyl ions, for example, sodium hydroxide. After the gel has absorbed the hydroxyl ions, it is separated from the excess solution and is heated, while avoiding the evaporation of water, for example, in an autoclave, until the major portion of the gel is converted to an aquasol. The aquasol is then separated from any unconverted gel as, for example, by centrifuging. This method is described in greater detail in the patent to John F. White, No. 2,375,738, granted May 8, 1945. The silica aquasols produced in accordance with this method when used together with a water-soluble condensation product of 20 molecular proportions of ethylene oxide and 1 molecular proportion of sorbitan mono-oleate give a preferred composition for use in the processing of textile fibers.

As examples of suitable water-soluble condensation products of an alkylene oxide with an ester of a fatty acid containing from 10 to 20 carbon atoms and a polyhydric alcohol containing from 3 to 6 carbon atoms and from 3 to 6 hydroxyl groups, may be mentioned the water-soluble condensation products of ethylene oxide with monoesters of such fatty acids and such polyhydric alcohols. Thus, the water-soluble condensation products of ethylene oxide with such monoesters as glycerol mono-oleate, glycerol monostearate, glycerol monopalmitate and the like; pentaerythritol mono-oleate, pentaerythritol monostearate, pentaerythritol monopalmitate and the like; and sorbitan mono-oleate; sorbitan monostearate, sorbitan monopalmitate and the like are suitable for use in the compositions of this invention. The monoester prepared from other fatty acids containing from 10 to 20 carbon atoms, for example, lauric acid, undecylic acid, tridecoic acid, pentadecanoic acid, linoleic acid and the like, may also be used in the preparation of such condensation products. Similarly, the monoesters prepared from other polyhydric alcohols containing from 3 to 6 carbon atoms and 3 to 6 hydroxyl groups, for example, mannitol, sorbitol, mannitan, $\alpha\beta\gamma$-butanetriol, pentaglycerol and the like, may also be used.

Instead of reacting the monoesters of a fatty acid and a polyhydric alcohol of the type described with ethylene oxide to prepare the water-soluble condensation products employed herein, the condensation products may be prepared from other alkylene oxides such as propylene oxide (otherwise known as 1,2-epoxypropane) of butylene oxide. However, it is preferred to employ ethylene oxide in the preparation of such condensation products, both from the standpoint of cost and suitability. The condensation products of the alkylene oxide and the ester of the fatty acid and polyhydric alcohol should contain an amount of combined alkylene oxide sufficient to render the condensation product water-soluble. The term "water-soluble" as used herein is intended to designate condensation products which are not only completely water-soluble, but also those condensation products which are highly dispersible in water, that is, form stable, colloidal solutions in water. The amount of combined ethylene oxide or alkylene oxide necessary to produce such water-soluble condensation products varies considerably depending upon the particular ester, with which it is reacted. In general, the condensation products prepared by condensing from 10 to 25 molecular proportions of ethylene oxide with 1 molecular proportion of the ester of the fatty acid and the polyhydric alcohol are water-soluble and may be used in the compositions of this invention.

In some instances the water-soluble condensation products of ethylene oxide or other alkylene oxide with diesters of the fatty acid and hexahydric alcohols such as sorbitol and mannitol or pentahydric alcohols may also be used in the compositions of this invention.

The preferred condensation product for use in the compositions of this invention is the water-soluble product containing 20 molecular proportions of ethylene oxide combined with 1 molecular proportion of sorbitan-mono-oleate. This product gives superior results.

The colloidal silica used in the compositions of this invention serves to increase the inter-fiber friction of unspun textile fibers such as cellulosic fibers as, for example, cotton, jute, flax, rayon staple fibers and acetate staple fibers and mixtures thereof; and other fibers such as wool fibers and mixtures of wool and cellulose fibers of the type described. This means that the application of colloidal silica to unspun textile fibers makes it possible to increase the spinning rate, or to reduce the turns per inch required during spinning, which in turn enables the production of stronger and more uniform slivers and yarns than is ordinarily possible in the processing of untreated textile fibers. Stronger yarns are formed also because of the increased inter-fiber friction which is imparted to the fibers by the use of colloidal silica.

The water-soluble condensation products, of the type hereinbefore described, serve as a carrier or binder for the colloidal silica, that is, they serve to bind the colloidal silica to the fibers in such a manner that it is not removed, or does not "dust off" to any appreciable extent during the subsequent mechanical processing and manipulation of the fibers. This is particularly important since the use on textile fibers of large amounts of colloidal silica per se, which normally enables the production of yarns having high tensile strength, has been found undesirable because of the excessive loss or dusting of the silica from the fibers during subsequent manipulations of the fibers. Thus, the use of the water-soluble condensation products makes it possible to use larger amounts of colloidal silica than have, heretofore, been considered desirable, and also virtually eliminates the dusting off of silica from the fibers during the normal processing of such fibers. The amount of such water-soluble condensation product used should be sufficient to bind the colloidal silica to the fibers, but insufficient to counteract appreciably the inter-fiber friction produced by the use of colloidal silica per se. In general, satisfactory results are obtained by using, in the composition, from 50 to 250% by weight, based on the silica in the silica aquasol, of the water-soluble condensation product. It is preferred, however, to use from 80 to 200% by weight, based on the silica in the silica aquasol, of the water-soluble condensation product.

The compositions of this invention are applied to unspun textile fibers at some stage of their processing prior to spinning and may be applied, for example, at the picker, or in the opening and picking line, or immediately after carding, or at some stage of their processing after the formation of the sliver, for example, during the drawing or roving operations. It is preferred, however, to apply the compositions to the textile fibers as they emerge from the card and just as they are being condensed into the rope-like sliver. The application of the composition to the fibers is suitably carried out, for example, by spraying the composition on the fibers, or by immersing the fibers in the composition and then squeezing and drying; or by supplying the composition to the interior of the sliver as, for example, by delivering the composition to an applicator device, which includes a hollow tube, through which the composition is supplied into the center of the sliver as the sliver is formed by condensing the web moving from the card. The composition is thus transferred from the hollow tube of the applicator device to the textile fibers by the wiping action of the latter as they move past and around the hollow tube of the applicator and are condensed. This method of application is preferred and is described, together with the means used, in greater detail in U. S. Patent No. 2,115,218 to Hughes L. Siever, granted April 26, 1938.

The treated fibers may be dried prior to spinning by heating as, for example, in a suitable drying oven, or the treated fibers may be allowed to dry without heating as they are being processed as, for example, during drawing, roving and spinning. It is preferred to allow the treated fibers to dry in the manner last described, however, since in most instances a separate drying step is unnecessary and increases the cost of the processing.

In general, the compositions of this invention are supplied to the textile fibers in an amount sufficient to provide from about 0.01 to 3% by weight of colloidal silica, based on the weight of the dry fibers. In some instances where it is desired to produce yarns of exceptionally high tensile strength and stiffness of the yarn is not objectionable, the composition is supplied to the fibers in an amount sufficient to provide up to 5% by weight of silica, based on the weight of the dry fibers. In some instances, the compositions of this invention may be diluted prior to their application to the fibers. Since the water-soluble condensation products hereinbefore described are present in the composition with the colloidal silica, they are supplied to the fibers in the same weight ratio of condensation product to silica which exists in such composition. Thus, in general, the yarn prepared from the treated fibers will comprise fibers containing from 0.01 to 5% by weight of silica, based on the weight of the dry fibers, and 50 to 250% by weight of the water-soluble condensation product, based on the weight of silica deposited on the fibers.

Since the silica is colloidal in size, it is believed that the silica does not penetrate into the fibers to any great extent, but that the silica is present on the fiber surface in the form of a non-continuous film the particles of silica being bound to each other and to the fibers by the water-soluble condensation product. Whatever explanation is advanced, however, the fact remains that the silica is present in such a form that it effectively increases the inter-fiber friction of the fibers and is also firmly bound to the fibers thereby resulting in markedly decreased dusting.

A further understanding of the present invention will be obtained from the following examples which are not intended to limit the scope of the present invention, parts and percentages being by weight.

EXAMPLE I (A) *Preparation of silica aquasol*

Seventy-three parts of 66° Bé. $H_2SO_4$ were diluted with 358 parts of water and charged to a mixing tank. Four hundred and seventy-two parts of an aqueous sodium silicate solution analyzing 8.9% $Na_2O$ and 29% $SiO_2$ were diluted with 377 parts of water. The silicate solution was added with stirring to the acid solution. The resulting mixture set up as a gel a few minutes after the mixing was completed. After the gel had aged for 16 hours the synthesis liquor was drained off and the gel was crushed to one-inch lumps. The gel lumps were washed with a continuous flow of water for 16 hours and were then covered with 750 parts of water containing 0.9 part of NaOH. After standing for 6 hours the solution was drained off and a portion of the gel lumps were charged to an autoclave equipped with a steam jacket. The gel was then heated for 4¼ hours, using steam at 210 pounds per square inch (absolute pressure) in the jacket of the autoclave. The contents of the autoclave were then blown out and the residual undispersed gel was removed from the resulting sol by centrifuging. The resulting sol contained about 12.5% $SiO_2$ and had a pH of 9.5 (glass electrode). This aquasol was diluted with water until 90 parts of the aquasol contained 10 parts of $SiO_2$ and 80 parts of water.

Ninety parts of the silica aquasol containing 10 parts of $SiO_2$ as obtained by the method described immediately above were stirred at room temperature during the addition thereto of 10 parts of the water-soluble condensation product of 20 molecular proportions of ethylene oxide with 1 molecular proportion of sorbitan-mono-oleate, until the resulting solution was homogenous. This solution was then applied to a web of 1 1/32 Strict Middling cotton fibers, as the web was being condensed into a sliver, by means of a hollow tube which was inserted into the central portion of the sliver as it was formed in such a way that the solution was taken up by the fibers by a wiping action as the sliver passed by the tube. The type of apparatus and the method of application employed are described in detail in U. S. Patent No. 2,115,218, hereinbefore referred to. The solution was supplied to the hollow tube in an amount sufficient to provide 0.5% silica and 0.5% of the condensation product, based on the weight of dry fibers.

The resulting sliver was drawn twice and then made into a roving in the normal manner.

A control roving was prepared from 1 1/32 inch Strict Middling cotton fibers in the normal manner, but without being treated with colloidal silica or the water-soluble condensation product.

A third roving was prepared from 1 1/32 inch Strict Middling cotton in the normal manner, except that it was treated with colloidal silica at the card as hereinbefore described, but without the use of the water-soluble condensation product.

During the preparation of the above rovings the respective slivers were observed during drawing and roving for dusting, and the respective rovings were then tested for break factor with the following results:

| Roving | Break Factor | Dusting |
|---|---|---|
| (1) Control | 14.9 | None. |
| (2) Sliver treated with 0.5% colloidal SiO$_2$ | 78.2 | Severe. |
| (3) Sliver treated with 0.5% colloidal silica and 0.5% water-soluble condensation product. | 81.4 | Slight. |

The roving prepared by treating the fibers with the colloidal silica and the water-soluble condensation product was then spun into yarn in the normal manner. No dusting of the silica occurred during the spinning operation and the resulting yarn had a high tensile strength.

EXAMPLE II

A composition was prepared by stirring at room temperature 100 parts of a 10% silica aquasol (prepared by diluting the 12.5% sol described in Example I) and 15 parts of a water-soluble condensation product of 20 molecular proportions of ethylene oxide and 1 molecular proportion of sorbitan monostearate until a homogenous solution was obtained. The resulting composition was supplied to 1 1/32 Strict Middling cotton fibers in an amount sufficient to provide 0.5% silica and 0.75% of the condensation product, based on the weight of the dry fibers. The composition was applied to the fibers at the card using the same procedure and apparatus described and referred to in Example I. The sliver obtained as a result of this treatment was processed into yarn in the normal manner, that is, by drawing, roving and spinning. No dusting of the silica was observed during the foregoing processing steps, and the fibers exhibited considerable inter-fiber friction during such operations. The yarn so produced had a high tensile strength.

Various modifications and changes may be made in the compositions and processes described herein as will be apparent to those skilled in the art without departing from the spirit and intent of the present invention. It is accordingly intended that the present invention be limited only by the scope of the appended claims.

What is claimed is:

1. A textile fiber processing composition comprising as essential ingredients an alkaline reacting silica aquasol containing from 5 to 45% by weight of silica and a substance consisting of a water-soluble condensation product of ethylene oxide and a mono-fatty acid ester of sorbitan in which the fatty acid portion of the ester has from 10 to 20 carbon atoms, said substance being present in said composition in amounts between 50 and 250%, based on the weight of the silica in said aquasol.

2. A textile fiber processing composition comprising as essential ingredients an alkaline reacting silica aquasol containing from 5 to 35% by weight of silica and a substance consisting of a water-soluble condensation product of ethylene oxide and a mono-fatty acid ester of sorbitan in which the fatty acid portion of the ester has from 10 to 20 carbon atoms, said substance being present in said composition in amounts between 80 and 200% by weight, based on the weight of silica in said aquasol.

3. A textile fiber processing composition comprising as essential ingredients an alkaline reacting silica aquasol containing from 5 to 35% by weight of silica and between 50 and 250% by weight, based on the weight of silica in said aquasol, of a substance consisting of a water-soluble condensation product of ethylene oxide and sorbitan mono-oleate.

4. A textile fiber processing composition comprising as essential ingredients an alkaline reacting silica aquasol containing from 5 to 35% by weight of silica and between 80 and 200% by weight, based on the weigth of silica in said aquasol, of a substance consisting of a water-soluble condensation product of 20 molecular proportions of ethylene oxide and 1 molecular proportion of sorbitan mono-oleate.

5. A textile fiber processing composition comprising as essential ingredients an alkaline reacting silica aquasol containing from 5 to 35% by weight of silica and between 50 and 250% by weight, based on the weight of silica in said aquasol, of a substance consisting of a water-soluble condensation product of ethylene oxide and sorbitan mono-stearate.

6. A textile fiber processing composition comprising as essential ingredients an alkaline reacting silica aquasol containing from 5 to 35% by weight of silica and between 80 and 200% by weight, based on the weight of silica in said aquasol, of a substance consisting of a water-soluble condensation product of 20 molecular proportions of ethylene oxide and 1 molecular proportion of sorbitan mono-stearate.

7. A textile yarn comprising textile fibers which contain frim 0.01 to 5% by weight of colloidal silica, based on the weight of the dry fibers, and from 50 to 250% by weight, based on the weight of said colloidal silica, of a substance consisting of a water-soluble condensation product of ethylene oxide and a mono-fatty acid ester of sorbitan in which the fatty acid portion of the ester has from 10 to 20 carbon atoms.

8. A textile yarn comprising textile fibers which contain from 0.01 to 3% by weight of colloidal silica, based on the weight of the dry fibers, and between 80 and 200% by weight, based on the weight of said silica, of a substance consisting of a water-soluble condensation product of ethylene oxide and sorbitan mono-oleate.

9. A textile yarn comprising textile fibers which contain from 0.01 to 3% by weight of colloidal silica, based on the weight of the dry fibers, and between 80 and 200% by weight, based on the weight of said silica, of a substance consisting of a water-soluble condensation product of ethylene oxide and sorbitan mono-stearate.

References Cited in the file of this patent

UNITED STATES PATENTS

| Number | Name | Date |
|---|---|---|
| 2,174,760 | Schuette et al. | Oct. 3, 1939 |
| 2,443,512 | Powers et al. | June 15, 1948 |
| 2,456,283 | Jefferson | Dec. 14, 1948 |
| 2,538,199 | Jefferson et al. | Jan. 16, 1951 |

OTHER REFERENCES

Ser. No. 261,159, Schiedewitz (A. P. C.), published April 20, 1943.

Atlas, "Surface Active Agents" (1948). Received in U. S. Pat. Office May 16, 1949—Table I between pages 26 and 27 and pages 39–40.